United States Patent
MacMillin et al.

(10) Patent No.: US 10,938,755 B1
(45) Date of Patent: Mar. 2, 2021

(54) BROWSER-INDEPENDENT MULTI-TAB COMMUNICATION METHODS AND SYSTEMS

(71) Applicant: salesforce.com, inc., San Francisco, CA (US)

(72) Inventors: Justin MacMillin, San Francisco, CA (US); Anal Shah, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/595,287

(22) Filed: Oct. 7, 2019

(51) Int. Cl.
*H04L 12/58* (2006.01)
*G06F 16/954* (2019.01)
*G06F 9/54* (2006.01)

(52) U.S. Cl.
CPC .............. *H04L 51/04* (2013.01); *G06F 9/542* (2013.01); *G06F 16/954* (2019.01)

(58) Field of Classification Search
CPC ......... H04L 51/04; G06F 16/954; G06F 9/542
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

United States Patent and Trademark Office, Notice of Allowance and Fee(s) Due in U.S. Appl. No. 16/140,705, dated Jan. 23, 2020.

*Primary Examiner* — Shirley X Zhang
(74) *Attorney, Agent, or Firm* — LKGlobal | Lorenz & Kopf, LLP

(57) ABSTRACT

A method for browser-based chat messaging is provided. The method presents browser-based presentation interfaces, including a master and at least one slave, and including a chat messaging interface for the master and establishes a single communication session with a server system, by the master. Based on a number of presentation interfaces associated with a chat session, a new presentation interface broadcasts a master/slave status request to the other presentation interfaces, receives responses from the other presentation interfaces, and configures a file in its session storage to identify itself as a slave based at least in part on a response from the master. Thereafter, the new presentation interface communicates with the server system via the master.

20 Claims, 6 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,707,513 B2 * | 4/2010 | Broda .................... H04L 67/02 715/804 |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,989,120 B2 | 3/2015 | McNamara et al. |
| 9,489,356 B2 | 11/2016 | Sheretov et al. |
| 10,642,916 B2 * | 5/2020 | Shah ..................... H04L 67/02 |
| 10,686,739 B2 * | 6/2020 | Shah ................... H04L 12/1813 |
| 10,739,954 B2 * | 8/2020 | Paniagua ................ H04L 67/02 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0078431 A1 | 4/2004 | Ahn |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0240054 A1 | 10/2007 | Todoroki et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0031153 A1 * | 2/2010 | Ortwein .................. G06F 9/542 715/733 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0367477 A1 | 12/2018 | Hariram et al. |
| 2019/0020673 A1 | 1/2019 | Weinstein et al. |
| 2020/0218771 A1 * | 7/2020 | Shah ..................... G06F 16/957 |

* cited by examiner

BROWSER-INDEPENDENT MULTI-TAB COMMUNICATION METHODS AND SYSTEMS

TECHNICAL FIELD

Embodiments of the subject matter described herein relate generally to client-server communications techniques established on the client side for messaging applications. More particularly, embodiments of the subject matter relate to a browser-based, client-side mechanism for enabling more than one browser-based messaging interface to communicate with a server using a single communication session.

BACKGROUND

During a web-browsing session, a user may navigate various websites using more than one browser application window and/or browser application tab. Users may wish to open certain webpages or sections of webpages and to keep them open, while continuing to browse other websites or sections using other open tabs or windows. In circumstances wherein a user has opened and is currently using a plurality of windows or tabs, servers communicating with the user's browser application are generally required to maintain a separate communication session for each open tab or window, thus requiring multi-threaded communications between the server and the client device. A server may not have the resources to maintain these multi-threaded communication sessions.

Browser windows and browser tabs used to navigate webpages may also provide messaging functionality for a user to participate in online communications with live agents or automated messaging applications (e.g., "chat-bots") associated with a business or company associated with a navigated webpage. Such messaging functionality may include capabilities to exchange text-based messages and/or rich content messages during a web-browsing session. Managing communication sessions across browser windows or tabs is complicated by the fact that often different browser applications having different software versions or developers will behave differently from one another, and that the browser application may vary across end users.

Accordingly, it is desirable to provide browser-independent client-server communications solutions that are less resource-intensive on the server-side. Other desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
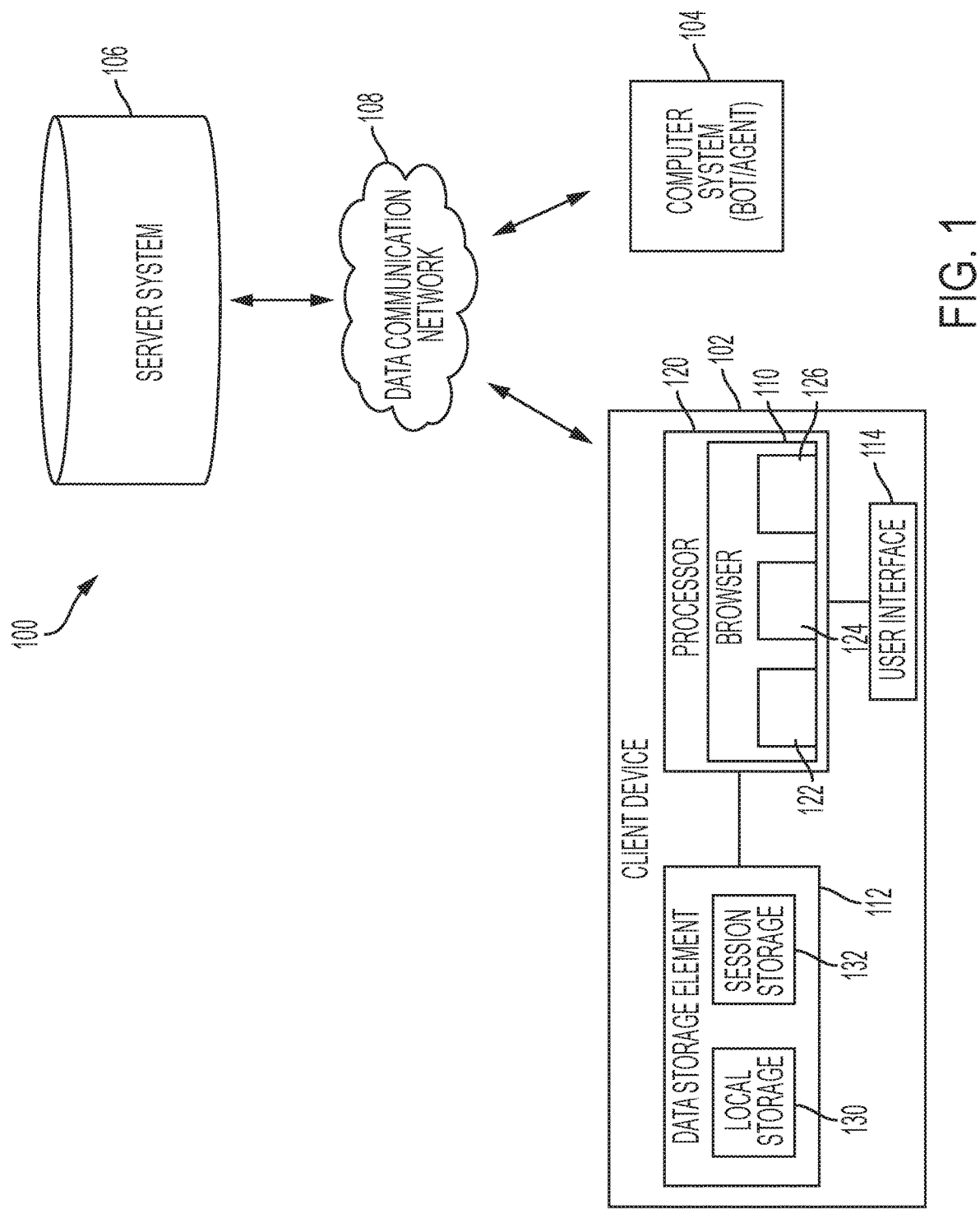
FIG. 1 is a diagram of a system for providing client-side, browser-based, communication session continuity for rendering rich content via a messaging application for a plurality of browser-based presentation interfaces, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for establishing a client-side, browser-based solution for communicating with one or more servers by a plurality of presentation interfaces, and corresponding chat messaging interfaces, provided by a client device. More specifically, the subject matter relates to establishing a master/slave model for the plurality of presentation interfaces, such that one particular "master" tab or window for the browser application establishes a communication session for exchanging data messages with the one or more servers and acts as an intermediary to facilitate the exchange of data transmissions between the one or more servers and at least one "slave" tab or window for the browser application. Further, the present disclosure provides systems and methods for ensuring continuity of rich content for chat messaging data displayed by a chat messaging interface presented by one of the above-described presentation interfaces. Specifically, providing rich content chat messages for newly-opened secondary browser windows or browser tabs (i.e., slave presentation interfaces) by locally storing and extracting rich content chat messages in a format compatible with preserving and retaining rich content characteristics of the chat messaging data, instead of converting locally stored chat messages into a plain-text format as is common in the art.

Certain terminologies are used with regard to the various embodiments of the present disclosure. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. A chat messaging interface is a graphical element provided by a presentation interface that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, and (2) communications received by the client device and directed to the user from other chat participants. The chat messaging interface is further configured to present communications from the user of the client device and other chat participants (e.g., an agent, a chat-bot) using text or rich content.

Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other HyperText Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a checkbox that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A communication session is a data transfer thread between the server system and a particular aspect of the client device which receives server-based data via the communication session. A master browser window or master browser tab (presented as part of the executed browser application) is an aspect of the client device capable of initiating and maintaining the one communication session between the browser application and one or more servers, wherein the one communication session is used by each of the presentation interfaces of the browser application to communicate with the server system. Slave windows or tabs communicate with the one or more servers by broadcasting data to be received by the master presentation interface, and the master presentation interface is configured to transmit the received data to the one or more servers.

As described in greater detail below in the context of FIGS. 5-6, in exemplary embodiments described herein, information identifying the master and slave status associated with different browser tabs is maintained in a private variable associated with one or more of the browser tabs, rather than session storage, to account for differences in how different browser applications manage or restrict session storage. In this regard, the private variable is stored in memory independent of or separate from the browser storage. In exemplary embodiments, a broadcast application program interface (API), which may alternatively be referred to herein as a broadcast pipeline, is utilized by a browser tab to broadcast a master/slave status request to other browser tabs containing an active chat messaging interface or widget integrated therein. The broadcast API allows the other browser tabs to respond directly to the requesting browser tab with a response that indicates the master or slave status of the respective browser tab. In exemplary embodiments, the broadcast API is a client-side API that allows for tabs to communicate using events when a value changes in either local storage or session storage. A master tab sets up receivers for events and slave tabs send events to the master tab via the broadcast API whenever an action like sending a user input occurs within a slave tab, while slave tabs set up receivers for events originating from the server that occur within the master tab.

Each browser tab that receives a broadcast master/slave status requests determines whether it is a master or a slave and transmits a response back to the requesting browser tab. In exemplary embodiments, each browser tab utilizes its associated unique identification information to identify or otherwise obtain a file associated with the respective browser tab. The file includes a value for a private variable that indicates whether that particular tab is a master or a slave. The browser tab then responds to the requesting browser tab with an indication of its respective status. The requesting browser tab utilizes the local storage to identify the number of active chat messaging interfaces and waits until the corresponding number of active chat messaging interfaces have responded with indication of their respective master/slave statuses or until timing out. When the requesting browser tab receives indication that one of the other tabs is already a master, the requesting browser tab updates the private variable in the file associated with the requesting browser tab to indicate that the requesting browser tab is a slave. The requesting browser tab then retrieves the content for populating its instance of the chat messaging interface from the master browser tab, for example, by requesting the chat messaging content from the master browser tab, which obtains the chat messaging content from its session storage and provides it back to the requesting browser tab using the broadcast API, which, in turn, may copy or otherwise store the chat messaging content in its associated session storage. By using private variables instead of local storage or session storage to track the master/slave status of the various active instances of a chat messaging session, the desired master/slave behavior can be maintained independent of the type of web browser application being utilized, thereby preserving server-side resources by ensuring only a single communication session (or active long poll connection) exists for a given end user.

Client-Side Chat Messaging Session Continuity

FIG. 1 depicts a block diagram of a system 100 for providing client-side, browser-based, communication session continuity for rendering rich content via a messaging application for a plurality of browser-based presentation interfaces, in accordance with the disclosed embodiments. As shown, the system 100 includes a client device 102 for operation by a user. The client device 102 may be implemented using a standalone personal computer, a portable computer (e.g., a laptop, a tablet computer, or a handheld computing device), a computer integrated into another device or system (e.g., a "smart" television, a smartphone, or a smartwatch), or any other device or platform including at least one processor 110, a data storage element 112 (or memory), and a user interface 114 to allow a user to interact with the client device 102. The user interface 114 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 102.

The client device 102 is capable of communicating with a remote server system 106 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 106 may include one or more remotely located servers, and the server system 106 provides any data for presentation via the browser application stored, maintained, executed, and supported by the client device 102. The server system 106 may provide internet-based data, intranet-based data, chat or messaging application data, communication session identifiers or other connection data, and any applicable data originating from a potential secondary computer system 104. The server system 106 may include any number of application servers, and each server may be implemented using any suitable computer. In some embodiments, the server system 106 includes one or more dedicated computers. In some embodiments, the server system 106 includes one or more computers carrying out other functionality in addition to server operations. In exemplary embodiments, the server system 106 operates within a client-server architecture, executing programs to serve the requests of other programs (i.e., a browser application executed by the client device 102). In this example, the client device 102 acts as the client, and the server system 106 performs some tasks on behalf of the client device 102, to include providing the browser application data.

One or more application servers of the server system 106 maintains and provides web-based data which enables users to interact over the Internet or an intranet. The client device 102 interacts with the server system 106 in such a way that the client device 102 provides data communications to the server system 106 and receives data communications from the server system 106. In certain embodiments, the server system 106 may act as an intermediary for a chat messaging session between the client device 102 and the computer system 104, wherein the server system 106 receives data communications from the computer system 104 that are directed to the client device 102, wherein the server system 106 receives computer system 104 data communications and the server system 106 then forwards the computer system 104 data communications to the client device 102 as part of a particular functionality of a browser application that is maintained, executed, and utilized via the client device 102. For example, when the client device 102 initiates a chat application or messaging application via the browser application, the computer system 104 may be operated by a customer service agent or other chat participant communicating with the user of the client device 102 via the chat messaging application. However, the computer system 104 does not communicate with the client device 102 directly. Instead, the server system 106 provides chat messaging application data, including functionality associated with the chat messaging application itself, and also including transmitted messages from the agent using the computer system 104 which have been sent to the server system 106 first and then forwarded as part of the chat messaging application data communications transmitted to the client device 102 throughout the duration of the chat messaging session. For purposes of explanation, but without limitation, the computer system 104 may alternatively be referred to herein as a chatbot system. However, it should be appreciated that the computer system 104 is not limited to chatbots and could be realized as any sort of server system that is capable of responding to communications, events, or other data in real time.

During typical operation, the client device 102 executes a browser application 120 and opens a first presentation interface for the browser application, wherein the first presentation interface 122 establishes a communication session with the server system 106 to exchange communications between the client device 102 and the server system 106. The communication session is associated with one distinct session identifier, and the communication session is the sole, exclusive communication thread established between the browser application 120 and the server system 106, irrespective of the number of open browser-based presentation interfaces 122, 124, 126. The first presentation interface 122 is a browser tab or browser window that provides a corresponding chat messaging interface or "chat window" through which a user can exchange chat messages with other parties. The user of the client device 102 can use the chat messaging interface to exchange messages with a live agent operator of the computer system 104, or with an automated agent (e.g., a "chat-bot") configured to exchange chat messages with users originating from the computer system 104 or the server system 106. Chat messages exchanged via the chat messaging interface may include text-based messages that include plain-text words only, and/or rich content messages that include graphical elements, enhanced formatting, interactive functionality, or the like.

The client device 102 proceeds to open one or more additional presentation interfaces 124, 126 (i.e., browser windows, browser tabs), and implements a master/slave model for the plurality of presentation interfaces 122, 124, 126 such that only the one single, individual communication session is maintained by the master presentation interface 122 to communicate with the server system 106, and each of the slave presentation interfaces 124, 126 transmits data to, and receives data from, the server system 106 via the established communication session of the master presentation interface 122. Thus, a browser-based, client-side solution is implemented to permit communications between the server system 106 and the plurality of presentation interfaces 122, 124, 126 of the client device 102. Each opened presentation interface 124, 126 presents another chat messaging interface, and the same chat messaging session is maintained and presented via each new chat messaging interface. When new browser windows or new browser tabs are opened and new chat messaging interfaces are presented, text-based messages are typically maintained and presented for the chat messaging session. As described herein and in greater detail in U.S. patent application Ser. No. 16/164,649, the client device 102 is also configured to implement a browser-based solution to locally store and retrieve rich content, such that any number of open presentation interfaces 122, 124, 126 (e.g., browser tabs, windows) may exchange rich content messages via the chat messaging interface wherein the rich content of each chat message is maintained and presented in a rich content format on each new presentation interface.

In exemplary embodiments, the data storage element 112 facilitates, supports or otherwise maintains local storage 130 that is accessible to all open presentation interfaces 122, 124, 126 of the browser application 120 for the lifecycle of the browser application 120, along with instances of session storage 132 that are associated with one particular presentation interface 122, 124, 126 of the browser application 120 for the lifecycle of the respective interface 122, 124, 126. As described in greater detail below in the context of FIGS. 5-6, in exemplary embodiments described herein, the presentation interfaces 122, 124, 126 utilize a private variable to track or otherwise maintain indicia of their respective master/slave status, to ensure that only a single communication session with the server 106 exists (e.g., via the master interface 122) independent of how the browser application 120 handles or manages session storage 132 upon opening of additional presentation interfaces 124, 126. For purposes of explanation, the subject matter may be described herein in the context of the presentation interfaces 122, 124, 126 being realized as tabbed GUIs (or simply tabs) that are presented within a larger browser window GUI; however, the subject matter is not limited to tabbed GUIs and may be implemented in an equivalent manner across multiple browser windows, and furthermore, may be implemented in connection with other non-browser client applications that support multiple presentation interfaces and communications with a remote system.

Figure 2:
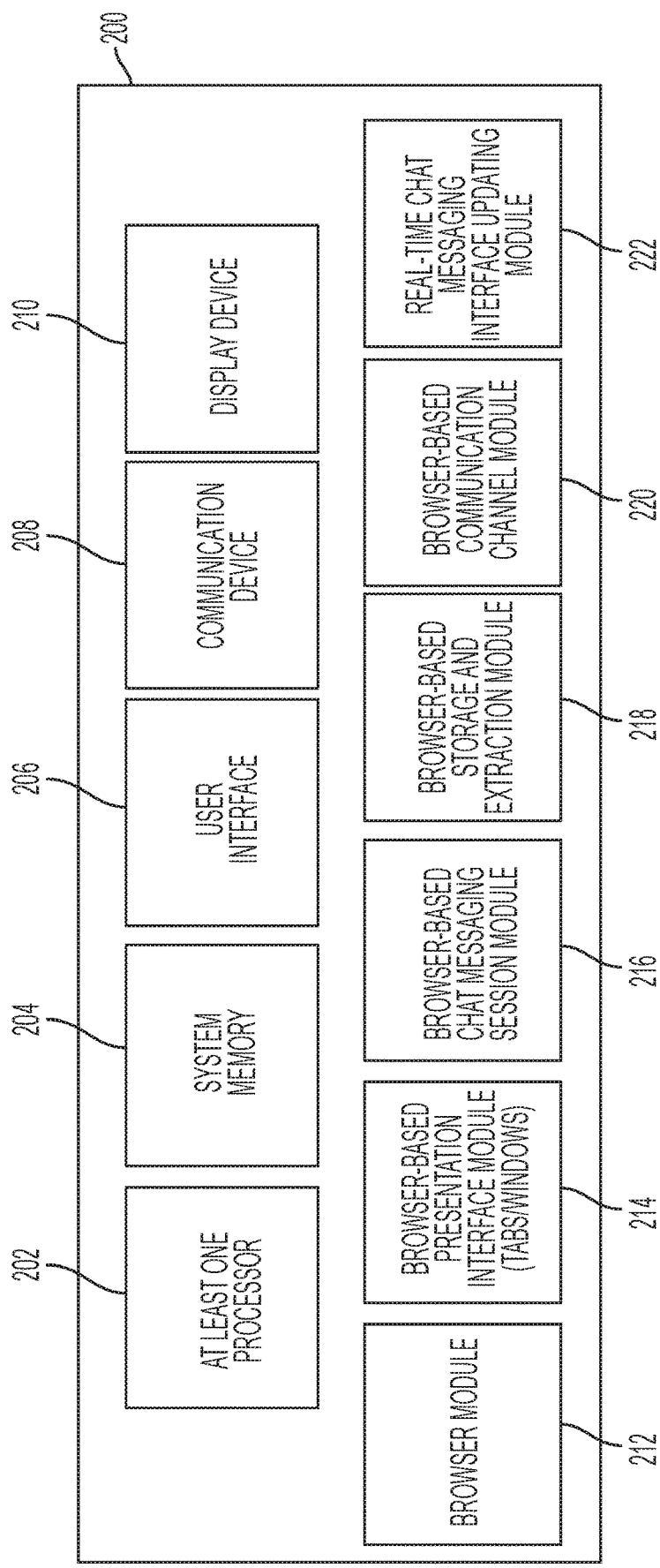
FIG. 2 is a functional block diagram of a computer system implemented as a client device communicating with a server system using a client-side, browser-based, single communication session for a plurality of browser-based presentation interfaces, in accordance with the disclosed embodiments.

FIG. 2 is a functional block diagram of a computer system implemented as a client device communicating with a server system using a client-side, browser-based, single communication session for a plurality of browser-based presentation interfaces, in accordance with the disclosed embodiments. It should be noted that the client device 200 corresponds to the client device 102 of FIG. 1. The client device 200 generally includes, without limitation: at least one processor 202; a system memory element 204; a user interface 206; a communication device 208; a display device 210; a browser module 212; a browser-based presentation interface module 214; a browser-based chat messaging session module 216; a browser-based storage and extraction module 218; a browser-based communication channel module 220; and a real-time chat messaging interface updating module 222. These elements and features of the client device 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the client device 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 communicates with system memory 204. The system memory element 204 is configured to store and maintain executable instructions, programming elements, computer hardware and software specifications and configurations, and any other data required for the performance of the client-side, browser-based chat-messaging communication techniques described herein. The system memory 204 may be realized using any number of devices, components, or modules, as appropriate to the embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the at least one processor 202. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the client device 200 via a browser software application connected to a server system (described previously with respect to FIG. 1). The user interface 206 may include or cooperate with various features to allow a user to interact with the client device 200 and, more particularly, to allow a user to interact with the browser application. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the client device 200. Further, and as described herein, the user interface module 206 may initiate the creation and maintenance of presentation interfaces (e.g., browser windows and/or browser tabs) implemented as graphical user interfaces (GUIs), rendered on a display device 210. In certain embodiments, the display device 210 implements touch-sensitive technology for purposes of interacting with the GUI. Thus, a user can manipulate the GUI by moving a cursor symbol rendered on the display device 210, or by physically interacting with the display device 210 itself for recognition and interpretation. Using input keyboard commands and/or touch-screen commands (among other types of input commands), the user could manipulate the GUI to interact with a browser application to access and interact with various applications, widgets, or features associated with the browser application.

In particular, the user interface module 206 presents GUI elements, widgets, and/or components associated with initiating and participating in a chat messaging session, including providing a chat messaging interface as an included component of a presentation interface, wherein the chat messaging interface is configured to present chat messaging data (e.g., user input chat messages received via the user interface 206, and chat messages received from the server system via the single communication session referenced in FIG. 1). The user interface module 206 is further configured to provide text-based chat messaging data and rich-content chat messaging data via the chat messaging interface, and to support and maintain continuity by presenting rich content chat messaging data across multiple open and active chat messaging interfaces (i.e., chat windows, chat screens, chat widgets) provided by all open browser tabs and browser windows for the browser application.

The communication device 208 is suitably configured to communicate data between the client device 200 and one or more remote servers (which may provide the client device 200 with server system data and/or potentially additional communication data from an optional second participant computer system, shown as reference 104 in FIG. 1). The communication device 208 may transmit and receive communications over a wireless local area network (WLAN), the Internet, a satellite uplink/downlink, a cellular network, a broadband network, a wide area network, or the like. As described in more detail below, data received by the communication device 208 may include, without limitation: browser application data, communication session identifier data, chat messaging session connection data, text-based chat messaging data, rich content chat messaging data, and other data compatible with the client device 200. Data provided by the communication device 208 may include, without limitation, user interactions with a chat messaging session, including user input text-based chat messaging data, rich content chat messaging data, user input selections and interactions with rich content chat messaging data, and the like.

The display device 210 is configured to display various icons, text, and/or graphical elements associated with a browser application, a plurality of presentation interfaces (e.g., browser windows, browser tabs) for the browser application, chat messaging interfaces (e.g., chat windows, chat widgets, chat components) for the browser application, text-based chat messaging data, and rich content chat messaging data, for the client device 200. In an exemplary embodiment, the display device 210 is communicatively coupled to the user interface 206 and the at least one processor 202. The at least one processor 202, the user interface 206, and the display device 210 are cooperatively configured to display, render, or otherwise convey one or more graphical representations or images associated with the browser application and a plurality of presentation interfaces on the display device 210, as described in greater detail below. In an exemplary embodiment, the display device 210 is realized as an electronic display configured to graphically display browser application data and presentation interface data, as described herein. In some embodiments, the display device 210 is implemented as a display screen of a stand-alone, personal computing device (e.g., laptop computer, tablet computer). It will be appreciated that although the display device 210 may be implemented using a single display, certain embodiments may use additional displays (i.e., a plurality of displays) to accomplish the functionality of the display device 210 described herein.

The browser module 212 is suitably configured to provide internet browser functionality for the client device 200, including the ability to locate, retrieve, and present websites requested by the client device 200 for user interaction via the client device 200. The browser module 212 is configured to open, maintain, and update a plurality of browser-based presentation interfaces (e.g., browser windows, browser tabs), in response to user input commands to open additional browser windows or tabs during browsing of a particular website, to navigate various links within a particular website which may open additional browser windows or tabs, and/or to refresh operation of a particular website. The browser module 212 is therefore configured to receive user input data to the browser application such that a user may make selections, navigate websites for the internet and/or an intranet, request server-based data, participate in chat messaging sessions, and to render text-based chat messaging data and rich content chat messaging data across a plurality of open browser windows and browser tabs simultaneously.

Further, the browser module 212 includes session storage that is associated with one particular presentation interface of the browser application, and local storage that is accessible to all open presentation interfaces of the browser application. The browser module 212 permits the opened presentation interfaces to access and use the local storage, and permits a first presentation interface to access session storage corresponding to the first presentation interface. Thus, the browser module 212 enables opened presentation interfaces to exchange data communications with other opened presentation interfaces, and enables each presentation interface to maintain stored data that remains inaccessible to other opened presentation interfaces unless transmitted or broadcast by the associated presentation interface (via the browser-based communication channel module 220).

The browser-based presentation interface module 214 is configured to provide a plurality of presentation interfaces, via the browser application, for user interaction with the browser application. A presentation interface is a graphical user interface (GUI) associated with the browser application, the GUI configured to present a document or panel including website data, text-based elements, graphical elements, user-selectable elements (e.g., menus, hyperlinks), and any other web-based, visually-presented graphic or text element configured to convey website data and/or to receive user input data. Presentation interfaces are generally implemented as browser windows or browser tabs. The browser-based presentation interface module 214 presents a first presentation interface when the browser application is executed, and is generally configured to open additional presentation interfaces in response to user input commands received via the user interface 206.

The browser-based chat messaging session module 216 is configured to establish and maintain a chat messaging session for the browser application. When the browser application is executed, a presentation interface (e.g., browser window, browser tab) is opened. The browser-based chat messaging session module 216 presents a chat messaging interface for a user of the client device 200 to use to conduct a chat messaging session. The chat messaging interface is a graphical element (e.g., window, widget, component) provided by a presentation interface that provides a visual representation of chat messaging data, and that enables a user to communicate with another chat participant. Typically, a chat messaging interface is implemented as a widget or window-inside-browser-window that is smaller than the browser tab or browser window (i.e., browser presentation interface GUI). The chat messaging interface is configured to present (1) user-entered communications, received via the user interface 206 of the client device 200, and (2) communications received by the client device and directed to the user from other chat participants, received by the client device 200 via the communication device 208 using a data communication network (reference 108 of FIG. 1).

The chat messaging interface is further configured to present communications from the user of the client device and other chat participants (e.g., an agent, a chat-bot) using a plain-text format and/or a rich content format. Communications transmitted and received via the chat messaging interface are referred to as "chat messaging data", which includes at least one of text-based chat messages and rich content chat messages. Text-based chat messages are appropriately named to describe exactly what is included: a plain-text message transmitted without requiring particular formatting or other visual effects. Plain-text messages include human-readable sequences of characters that form words and phrases, and that may be encoded into computer-readable formats (e.g., American Standard Code for Information Interchange (ASCII)).

Rich content chat messages may include rich content only, or any combination of text and rich content. Rich content may include graphical elements, enhanced formatting, interactive functionality, and the like. Graphical elements include pictures, symbols, icons, and any other visual representation displayed as part of a presentation interface (i.e., browser window, browser tab). Enhanced formatting refers to visually augmented text representations that include color, styling (e.g., bold text, italic text), text sizing, and other Hyper-Text Markup Language (HTML) features (e.g., hyperlinks). Text representations with enhanced formatting may also be referred to as formatted text, styled text, or rich text. Interactive functionality refers to graphical elements configured to receive user input, such as a graphical button for virtual "push" via user click/selection, a radio button filled in by user selection, a check-box that is "checked" by user selection, a picture or icon that is highlighted, framed, or otherwise indicated as selected by user click/selection, a graphical dial or slider configured for user adjustment, or the like. Interactive functionality of rich content includes any visual representation configured for user interaction and displayed via a chat messaging interface.

A chat messaging session is a conversation or, in other words, a chat messaging session is an exchange of messages between chat participants, wherein one of the chat participants is a user of the client device 200. The chat messaging session is a concept different from a chat messaging interface, as follows: the chat messaging session is the conversation, and the chat messaging interface is the graphical element through which the conversation is conducted and presented by the client device 200. The chat messaging session is also a concept different from the communication session established between the master presentation interface and the remote server system. The chat messaging session is an exchange of communications during one particular conversation between defined parties, wherein the communication messages are exchanged between the client device 200 and the remote server system. The chat messaging session begins when a user of the client device 200 provides a user input command to begin, execute, or otherwise initiate the chat messaging session, via a presentation interface of the browser application. Generally, a user clicks a link on a particular website to begin the chat messaging session, wherein the link is provided via a presentation interface, and wherein user selection of the link executes a chat messaging interface through which the user may conduct the chat messaging session by communicating with one or more defined parties. Once the conversation (i.e., the chat messaging session) between the defined parties has begun, the The browser-based storage and extraction module 218 is configured to enable the browser application to store rich content chat messages (received via the browser-based chat messaging session module 216) such that the rich content is preserved when the stored rich content messages are later retrieved for viewing via a second chat messaging interface on a second presentation interface. In other words, the browser-based storage and extraction module 218 functions to ensure that rich content chat messages received using a chat interface of a first browser window or browser tab, may be viewed in the original rich content format using a chat messaging interface presented by a different browser window or browser tab of the browser application. To preserve the rich content characteristics, the browser-based storage and extraction module 218 is configured to use a particular storage format and a particular storage location compatible with the browser-based, client-side communication. More specifically, the browser-based storage and extraction module 218 stores rich content chat messaging data as JavaScript Object Notation (JSON) objects in session storage of the master presentation interface. When stored as a JSON object, the characteristics of a rich content chat message are retained, such that when a new browser window or browser tab is opened and the chat messaging session is continued using the new browser window or tab, then the rich content chat message is extracted from the session storage of the master window/tab as a JSON object and presented as a rich content chat message on the new browser window/tab. As described previously, chat messages may be text-based chat messages that are presented in a plain-text format and/or rich content chat messages that are presented using rich content (described previously with regard to the browser-based presentation interface module 214), as shown in FIG. 3.

Figures 3, 4:
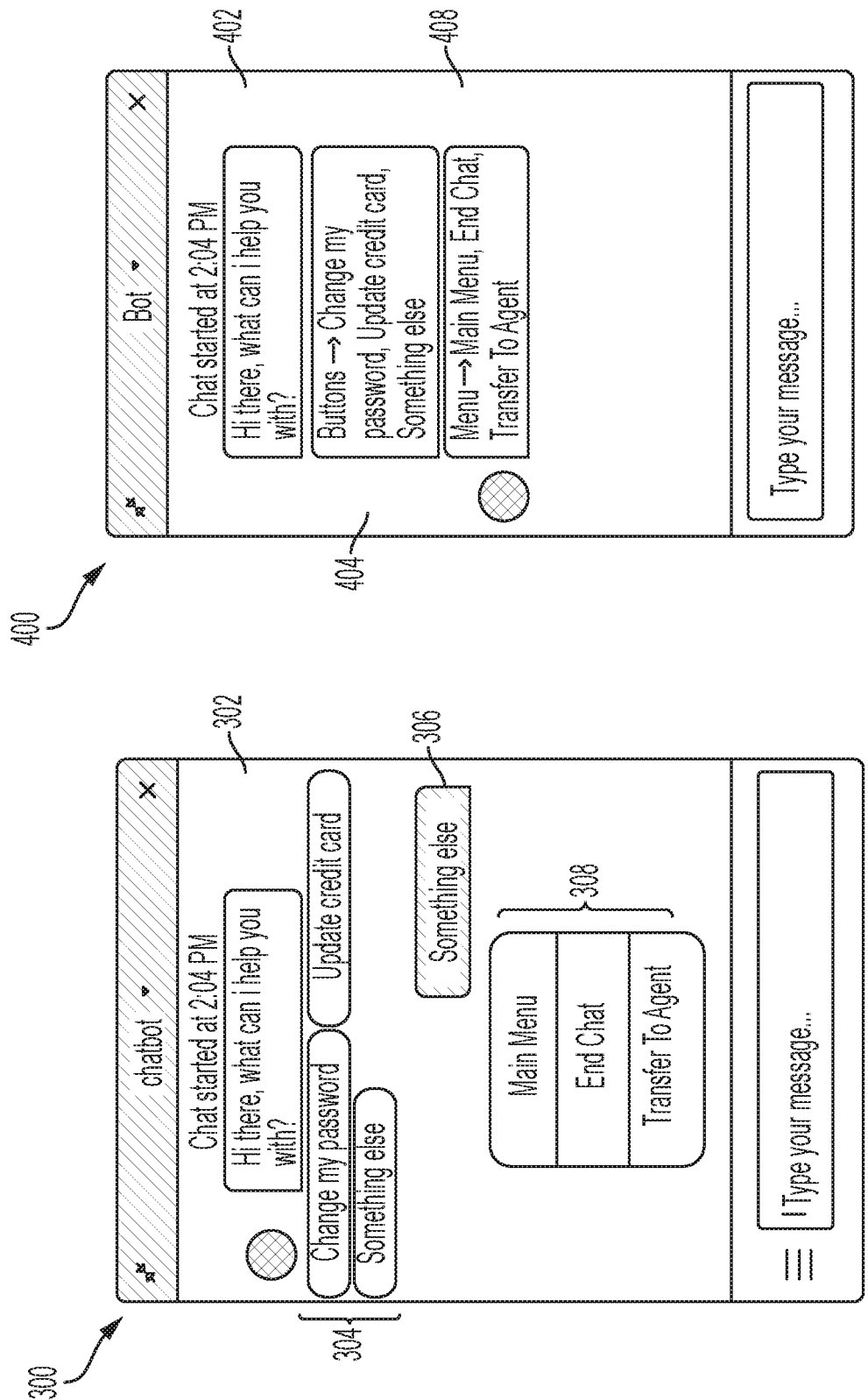
FIG. 3 is a diagram of an embodiment of a chat messaging interface 300 configured to render rich content chat messages and text-based chat messages, in accordance with the disclosed embodiments.
FIG. 4 is a diagram of an embodiment of a chat messaging interface configured to render a text-based version of rich content extracted from browser-based storage, in accordance with the disclosed embodiments.

FIG. 3 is a diagram of an embodiment of a chat messaging interface 300 configured to render rich content chat messages and text-based chat messages. As shown, the chat messaging interface 300 presents chat messages for one particular chat messaging session between a user of a client device (see reference 102, FIG. 1; reference 200, FIG. 2) and a "chat-bot" (i.e., an automated chat participant for providing chat messaging data to a user during a chat messaging session). The first chat message includes a text-based chat message 302 and a rich content chat message 304 received from the chat-bot to initiate the chat conversation. The text-based chat message 302 is a plain-text question "Hi there, what can I help you with?", and the rich content chat message 304 is a set of graphical elements provided for user interaction. In this scenario, the rich content chat message 304 includes three graphical buttons that a user may select to provide user input to the chat-bot. As shown, the graphical buttons include potential user input responses including: (1) "Change my password", (2) "Update credit card", and (3) "Something else". The chat messaging interface 300 shows that the user has provided the user input response "Something else" by selecting the appropriate graphical element, as shown by the displayed text-based message 306 that includes the text representation "Something else". The chat messaging interface 300 also presents a graphical element below the chat messages, wherein the graphical element is a menu 308 of additional user-selectable options from which the user may select to view the "Main Menu" for the chat-bot to present other user-selectable options; the user may select to "End Chat" to terminate the chat messaging session with the chat-bot; and the user may select to "Transfer to an Agent" to transfer the conversation from the chat-bot as the chat participant exchanging chat messages with the user to a live human agent operating a computer system (see reference 104, FIG. 1) as the chat participant exchanging chat messages with the user. As shown in FIG. 3, the chat messaging interface 300 is capable of presenting both text-based chat messages and rich content chat messages.

Returning to FIG. 2, typically, the client device 200 stores chat messages using a string format for later retrieval and use by a browser application. However, if a chat message that includes rich content (i.e., a rich content chat message) is stored in a string format for later retrieval and presentation via the chat messaging interface, then the rich content characteristics of the rich content chat message would be lost and, upon retrieval from storage, the rich content chat message would instead be displayed in a plain-text format, as shown in FIG. 4.

FIG. 4 is a diagram of an embodiment of a chat messaging interface 400 configured to render a text-based version of rich content that has been extracted from browser-based storage. FIG. 4 is one embodiment of typical operation of a chat messaging interface 400 provided by a browser window or browser tab (i.e., a presentation interface), wherein the chat messaging interface 400 does not include any mechanism for preserving rich content when the browser window or tab has been refreshed or when the user opens a second browser window or tab (i.e., a slave presentation interface) in addition to the first browser window or tab (i.e., the master presentation interface)

Like the chat messaging interface shown in FIG. 3, the chat messaging interface 400 presents chat messages for one particular chat messaging session between a user of a client device (see reference 102, FIG. 1; reference 200, FIG. 2) and a "chat-bot" (i.e., an automated chat participant for providing chat messaging data to a user during a chat messaging session). However, the chat messaging interface 400 of FIG. 4 differs from the chat messaging interface 300 of FIG. 3, due to a lack of rich content displayed. In FIG. 3, the chat messaging interface 300 presents chat messaging data that includes text-based chat messages and rich content chat messages. In contrast, the chat messaging interface 400 of FIG. 4 retrieves the displayed chat messaging data from session storage of the master presentation interface, wherein the chat messaging data is presented as plain-text representations, indicating that the rich content chat messages were converted into a string format before storage in the session storage of the master presentation interface.

As shown, the first chat message includes a text-based chat message 402 and a converted rich content chat message 404 that has been retrieved from session storage of the master presentation interface. The text-based chat message 402 and the converted rich content chat message 404 were originally received by the master presentation interface via the single communication session, and from the chat-bot to initiate the chat conversation. However, in the illustrated scenario, the chat messaging interface 400 is a slave presentation interface that is either newly opened or just refreshed by the user. Generally, the rich content chat messages are text-based due to browser window/tab refresh or due to opening a new browser window/tab. In both situations, the chat messaging interface 400 extracts a stored version of the chat messaging session from session storage of the master presentation interface to display the stored version via the chat messaging interface 400. Thus, the chat messaging interface 400 has retrieved the chat session data from session storage of the master presentation interface.

Like FIG. 3, the text-based chat message 402 is a plain-text question "Hi there, what can I help you with?" However, unlike FIG. 3, the converted rich content chat message 404 does not include rich content (e.g., graphical elements provided for user interaction). In this scenario, the converted rich content chat message 404 includes a plain-text representation of the three graphical buttons: (1) "Change my password", (2) "Update credit card", and (3) "Something else". The chat messaging interface 400 also presents a second converted rich content element 408 below the chat messages, wherein the second converted rich content element 408 is a plain-text representation of the menu of additional user-selectable options (e.g., "Main Menu", "End Chat", "Transfer to an Agent"). As shown in FIG. 4, the chat messaging interface 400 is capable of presenting text-based chat messages and converted rich content chat messages that have been converted into a plain-text format.

To solve this problem, as described herein and in greater detail in U.S. patent application Ser. No. 16/164,649, the client device (reference 102, FIG. 1; reference 200, FIG. 2) is configured to store the chat messaging data in session storage of the master presentation interface in a JavaScript Object Notation (JSON) object format, such that the rich content characteristics of the chat messaging data are retained and displayed via a slave presentation interface that is newly-opened or refreshed by a user.

Returning to FIG. 2, thus, the browser-based storage and extraction module 218 stores chat messaging data using a storage format and storage location such that rich content chat messages retain rich content characteristics, preventing inadvertent conversion of rich content chat messages (and formatting, visual effects, and interactive capabilities of the rich content chat messages) into plain-text format when stored by the browser application and later retrieved for use. The chat messaging data is stored in session storage for the master presentation interface, and the session storage is propagated to other open browser tabs and browser windows via a broadcast pipeline of the browser application.

Rich content chat messages are locally stored by the browser application in session storage of a particular presentation interface as JSON objects, and the broadcast pipeline is used to transmit the JSON objects to other open presentation interfaces such that the rich content chat messages are presented in a rich content format across all open presentation interfaces. Continuity of rich content chat messages (across all open presentation interfaces for the browser application) is thus provided through the storage format for the rich content chat messages (e.g., JSON object storage), and the retrieval method for the rich content chat messages (e.g., obtaining rich content chat messages via the broadcast pipeline for the browser application).

The browser-based communication channel module 220 is configured to perform internal and external communication functions for the client device 200. The browser-based communication channel module 220 includes two separate and distinct aspects: (1) establishing and maintaining one single, distinct, individual communication session between a master presentation interface and one or more remotely located servers, via the communication device 208; and (2) establishing and maintaining a broadcast pipeline for the plurality of presentation interfaces to communicate among themselves by broadcasting data transmissions to all open presentation interfaces of the browser application, which are received by those presentation interfaces that are configured to "listen" for applicable and relevant broadcasted data. As described herein, a distinct and individual communication session is a data transfer thread between the server system and a particular aspect of the client device which receives server-based data via the communication session. A master browser window or master browser tab (presented as part of the executed browser application) is an aspect of the client device capable of initiating and maintaining the communication session. Slave windows or tabs communicate with the one or more servers by broadcasting data to be received by the master presentation interface, and the master presentation interface is configured to transmit the received data to the one or more servers.

As described herein, each of the open presentation interfaces of the browser application is capable of presenting a chat messaging interface to enable a user of the client device 200 to participate in a chat messaging session wherein the user provides user input chat messages to the client device 200 and the user receives chat messages from a second chat participant via the distinct communication session between the client device 200 and a remote server system. (As described with regard to FIG. 1, chat messages received by the client device 200 may be from a live agent user of the computer system 104 or from an automated "chat-bot" implemented via the computer system 104 or the remote server system 106. In either case, the server system 106 that has the communication session with the client device 102 receives all chat communications and then directs and transmits the chat communications to the appropriate receiving computer system/client device/receiving party.) Chat messaging interfaces, displayed and associated with corresponding presentation interfaces, are configured to present chat messages in a plain-text format and in a rich content format. The browser-based communication channel module 220 is thus configured to provide a communication channel for transmitting chat messaging data that includes both plain-text chat messaging data and rich content chat messaging data.

The real-time chat messaging interface updating module 222 is configured to dynamically update all presentation interfaces of the browser application, in real-time, such that all open presentation interfaces (and corresponding chat messaging interfaces) present the same interactive data for a current chat messaging session, including rich content messages that include visual effects and interactive functionality. The real-time chat messaging interface updating module 222 is configured to use the broadcast pipeline (via the browser-based communication channel module 220) to provide updates to a master presentation interface from one or more slave presentation interfaces, and to provide updates to a set of slave interfaces from a master presentation interface. As one example, a rich content chat message received as user input to a particular slave presentation interface is provided to the master presentation interface via the broadcast pipeline as an update, which may then be provided via the broadcast pipeline from the master presentation interface to all open slave presentation interfaces. In this scenario, all open presentation interfaces and corresponding chat messaging interfaces are dynamically updated to include the user input rich content chat message, in real-time. As another example, a rich content chat message may be received by the master presentation interface from a remote server via the one distinct communication session between the master presentation interface and the remote server, and the rich content chat message may then be provided via the broadcast pipeline from the master presentation interface to all open slave presentation interfaces. In this scenario, all open presentation interfaces and corresponding chat messaging interfaces are dynamically updated to include the server-provided rich content chat message, in real-time.

Master/Slave Management Using Client-Side Broadcasting

Figure 5:
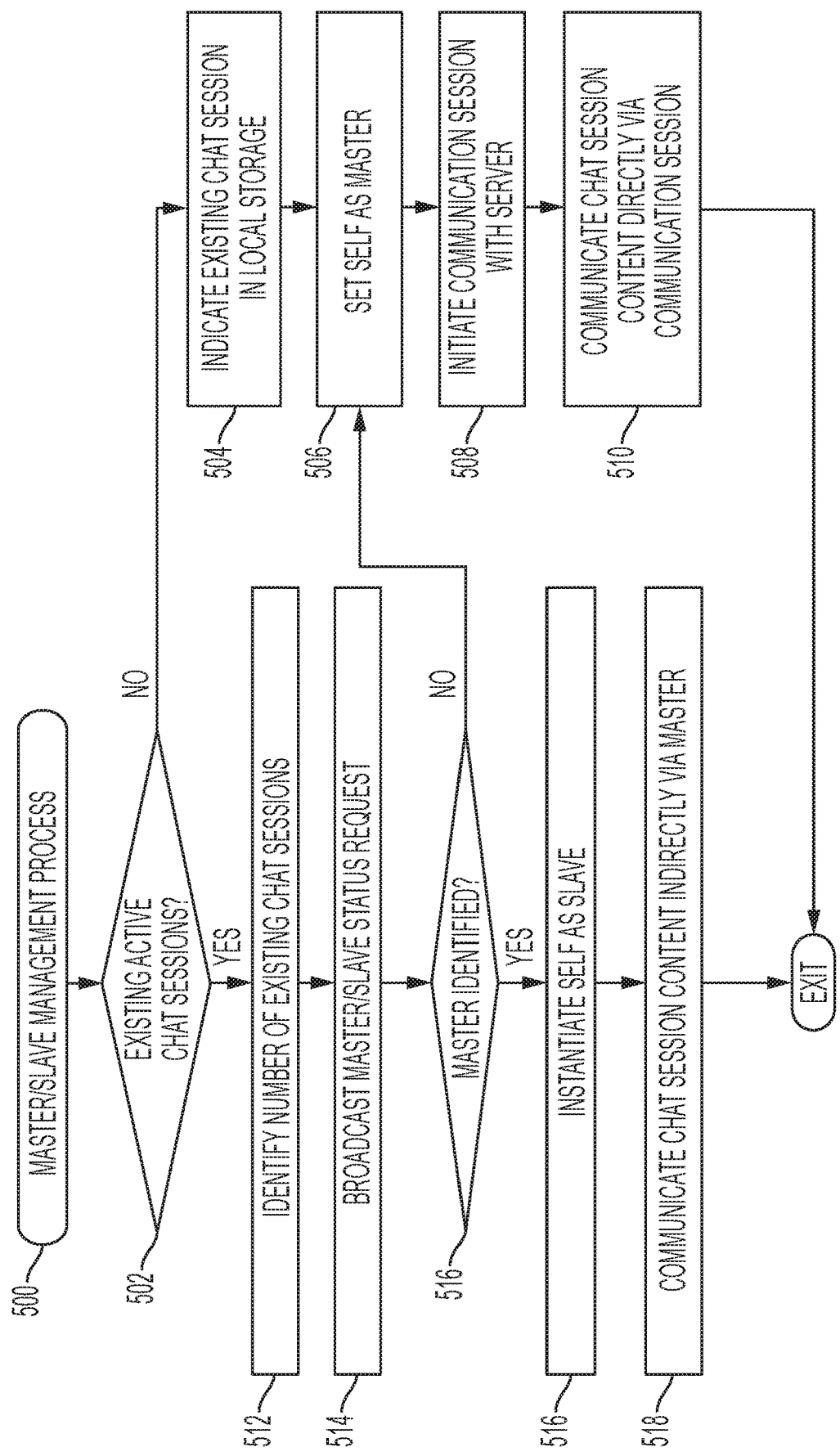
FIG. 5 is a flow diagram of an exemplary master/slave management process suitable for implementation in the system of FIG. 1 in accordance with one or more exemplary embodiments.
Figure 6:
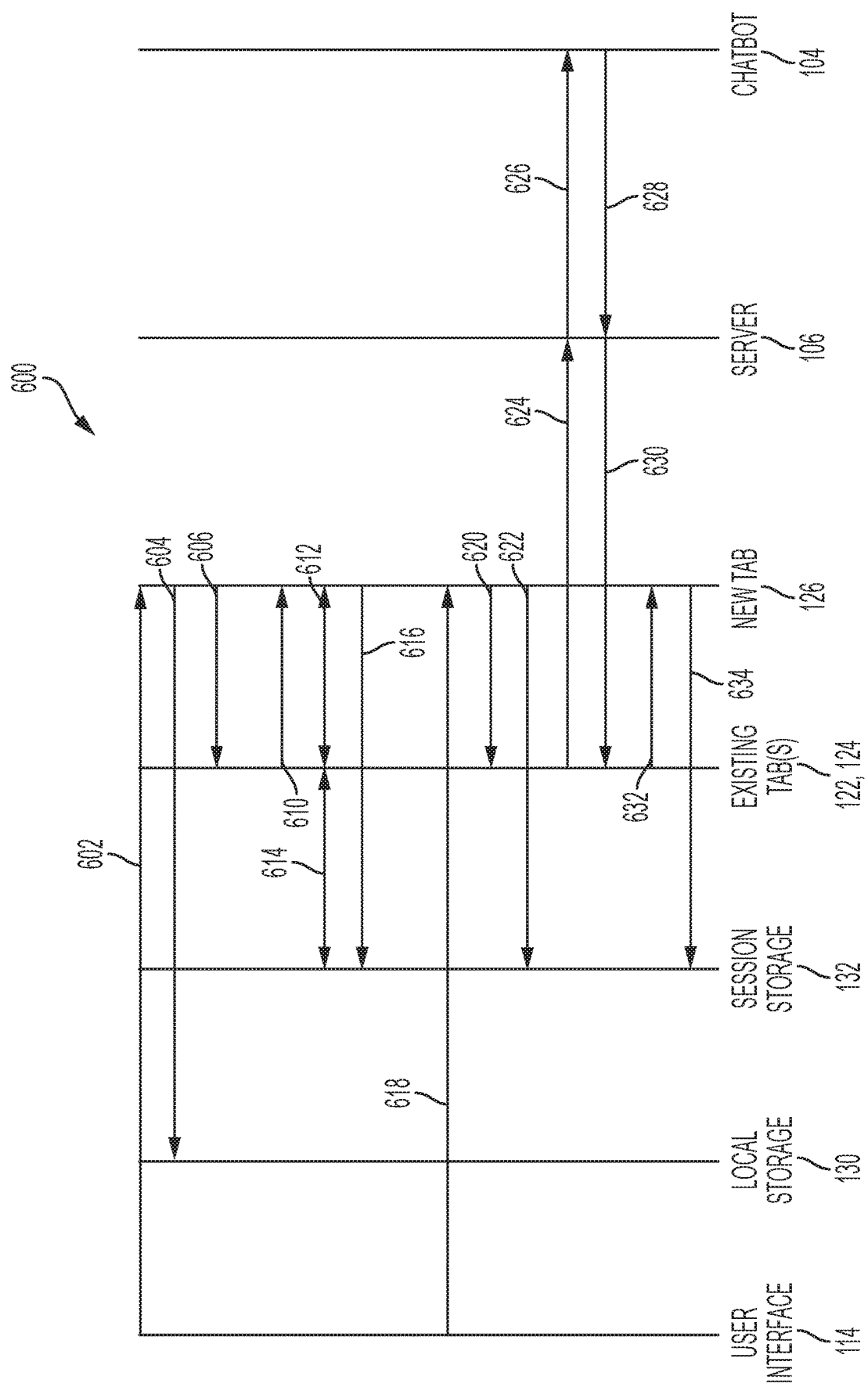
FIG. 6 depicts a sequence of communications within the system of FIG. 1 in connection with the master/slave management process in accordance with one or more exemplary embodiments.

FIG. 5 depicts an exemplary master/slave management process 500 that may be implemented or otherwise performed by an instance of a presentation interface (e.g., one of presentation interfaces 122, 124, 126) that includes an integrated chat messaging interface or widget upon opening, creation, or other instantiation to avoid inadvertent establishment of multiple communication sessions with a server (e.g., server system 106), and FIG. 6 depicts an exemplary sequence 600 of communications or other tasks or operations that may be performed in connection with master/slave management process 500 of FIG. 5. The client-side master/slave management process 500 resolves issues that could otherwise arise from different browser behaviors, for example, upon opening new tabs. Thus, the master/slave management process 500 is able to avoid scenarios where more than one browser tab (or window) believes it is the master, and thereby maintains only a single communication session with a server rather than inadvertently initiating additional communication sessions which could disrupt the preexisting communication session (e.g., if server-side rules result in termination of the existing communication session), undesirably consume server resources, or otherwise impair the ability to maintain consistency and continuity across tabs. While exemplary embodiments of the master/slave management process 500 may be described herein in the context of opening, creating, or otherwise instantiating a new browser tab, the subject matter is not limited to a new browser tab event and may be performed in response to other trigger events, such as, for example, a refresh of the master tab, the master tab navigating to a different web page or network address, an end user clicking or otherwise selecting a hyperlink within the master tab, and the like.

Referring to FIG. 5, in exemplary embodiments, the process 500 begins by checking local storage to identify or otherwise determine whether there are any existing active chat sessions that correspond to the chat session within the newly instantiated presentation interface, and in the absence of any existing active chat sessions, the newly instantiated presentation interface updates the local storage to indicate there is now an existing active chat session and sets itself as master for that chat session (tasks 502, 504, 506). In this regard, in exemplary embodiments, when a communication session with a server for purposes of supporting a chat session is established, the master presentation interface instantiates or otherwise sets a variable in local storage 130 that is associated with a unique identifier for the chat session to a value of 1 to indicate an active chat session. For example, the master presentation interface 122 may instantiate or otherwise create a variable ACTIVE_CHAT_SESSIONS in local storage 130 that is associated with a unique identifier for the chat messaging session to be supported. In this regard, the unique identifier may include or otherwise incorporate identifying information associated with the particular chatbot system 104 that is part of the chat session (e.g., using the uniform resource locator (URL) address, internet protocol (IP) address, domain, or other identifying information associated with the chatbot system 104). The master presentation interface 122 sets the value of the local storage variable to 1 (e.g., ACTIVE_CHAT_SESSIONS=1) to indicate the presence of an existing chat session. In this regard, in the absence of a local storage variable associated with the unique identifier for the chat messaging session to be supported or if the local storage variable associated with the unique identifier for the chat messaging session to be supported is equal to zero, the newly instantiated presentation interface determines it should be the master. Upon such determination, the newly instantiated presentation interface may instantiate or otherwise create a private JavaScript variable that indicates it is the master. For example, the master presentation interface 122 may instantiate or otherwise create a private variable isTabMaster in a JavaScript file associated with the page and set the variable value to indicate it is the master (e.g., a value of 'TRUE,' '1', a unique identifier associated with the master presentation interface 122, etc.).

In the illustrated embodiment, after determining and designating oneself as master, the process 500 continues with the master presentation interface initiating or otherwise establishing a communication session with the server system and communicating content for the chat session directly to/from the server system via that communication session (tasks 508, 510). In exemplary embodiments, the master presentation interface 122 transmits or otherwise provides a long-polling request to the server system 106, which, in turn, holds the request open to maintain an available communication session with the master presentation interface 122 for providing chat messaging content from the chatbot system 104 back to the master presentation interface 122 without incurring additional overhead (e.g., handshaking or other signaling required to establish another connection). In response to the long-polling request, the server system 106 may similarly initiate a long-polling communication session with the chatbot system 104, thereby allowing the master presentation interface 122 and the chatbot system 104 to communicate bidirectionally via the server system 106 substantially in real-time without delays that could otherwise be associated with reestablishing communication sessions for each individual communication. In exemplary embodiments, the master presentation interface 122 also creates or instantiates a session storage variable that maintains information or data pertaining to the communication session with the server system 106 along with the serialized chat messaging content that has been communicated to/from the chatbot system 104. For example, the master presentation interface 122 may instantiate or otherwise create a variable CHASITOR_SERIALIZED_KEY in its session storage 132 that includes or otherwise maintains associations between data pertaining to the established long-polling connection with the server system 106 (e.g., a poll count and the like for synchronizing the client and server within the real-time conversation) and the serialized time-ordered sequence of text and/or rich content that make up the communications sent to and/or received from the chatbot system 104.

On the other hand, when the newly instantiated presentation interface identifies existing chat sessions, the process 500 proceeds by identifying or otherwise determining the number of existing chat sessions using the local storage and then broadcasts or otherwise transmits a master/slave status request intended for receipt by the existing presentation interfaces (tasks 512, 514). In this regard, when a presentation interface 124 identifies a variable in local storage 130 that is associated with the unique identifier for the chat session to be supported and has a nonzero value or otherwise indicates an existing chat session for that identifier, the presentation interface 124 determines there are existing active chat sessions and obtains the number of existing active chat sessions from local storage 130 (e.g., the current value of the ACTIVE_CHAT_SESSIONS local storage key). The newly instantiated presentation interface 124 then generates a broadcast request for the master/slave status for existing presentation interface(s) associated with the same chat session, and then broadcasts the master/slave status request using the broadcast API. In exemplary embodiments, the existing presentation interface(s) associated with the same chat session are configured to listen for or otherwise detect broadcast events corresponding to its chat session. In response to receiving the broadcast master/slave status request, the existing presentation interface(s) are configured to check its respective JavaScript file in local storage 130 to identify whether the private JavaScript variable indicates it is a master or slave and provide a corresponding response. For example, the master presentation interface 122 may obtain the value of its private JavaScript variable isTabMaster (e.g., TRUE) and broadcast the value back out to the newly instantiated presentation interface 124 using the broadcast API. In some embodiments, slave presentation interfaces do not create a private variable for indicating master status, and thus, broadcast a response that include a null value or otherwise indicates slave status.

The process 500 monitors or otherwise waits for master/slave status responses from the other presentation interfaces associated with the existing chat sessions until receiving the number of responses corresponding to the number of existing chat sessions or otherwise timing out, and thereafter identifies or otherwise determines whether a master exists (task 516). In this regard, in a scenario when the newly instantiated presentation interface receives the number of responses corresponding to the previously-identified number of active chat sessions but none of the existing presentation interfaces identifies itself as master, the newly instantiated presentation interface may increment or otherwise update the number of existing chat sessions in local storage to account for itself and then set itself as master, in a similar manner as described above. For example, upon refresh, the presentation interface 122 may broadcast a master/slave status request using the broadcast API, and receiving responses from other presentation interfaces 124, 126 indicating they are slaves. Thus, the presentation interface 122 may determine it was the master prior to the refresh and re-set itself as master after the refresh. Conversely, when the process 500 receives a response indicating another presentation interface is the master, the newly instantiated presentation interface instantiates itself as a slave and thereafter communicates with the chatbot system indirectly via the master presentation interface (task 518, 520).

For example, in response to identifying the existing master presentation interface 122, the second presentation interface 124 may instantiate itself as a slave by creating a JSON object or similar file corresponding to its instance of the chat session that does not include the isTabMaster variable or includes the isTabMaster variable set to a value that indicates it is a slave (e.g., 'FALSE,' '0'; an identifier of the master presentation interface 122, or the like). Thereafter, the second presentation interface 124 copies the existing chat messaging content from the session storage 132 for the master presentation interface 122 to its own session storage 132, in a similar manner as described in U.S. patent application Ser. No. 16/164,649. User inputs received via the chat messaging interface within the slave presentation interface 124 are provided to the master presentation interface 122 using the broadcast API, with the master presentation interface 122 then retransmitting the input chat messaging content to the server system 106 via the existing communication session between the master presentation interface 122 and the server system 106. Similarly, chat messaging content provided by the chatbot system 104 responsive to any user inputs within the chat messaging interface within the slave presentation interface 124 are provided by the server system 106 to the master presentation interface 122 via the existing communication session between the master presentation interface 122, with the master presentation interface 122 providing the updated chatbot content to the slave presentation interface 124 using the broadcast API. Further details regarding indirect communications via a master presentation interface are provided in U.S. patent application Ser. No. 16/164,649.

It should be appreciated that the master/slave management process 500 may include any number of additional or alternative tasks, the tasks need not be performed in the illustrated order and/or the tasks may be performed concurrently, and/or the master/slave management process 500 may be incorporated into a more comprehensive procedure or process having additional functionality not described in detail herein. Moreover, one or more of the tasks shown and described in the context of FIG. 5 could be omitted from a practical embodiment of the master/slave management process 500 as long as the intended overall functionality remains intact.

FIG. 6 depicts an exemplary sequence 600 of communications within the system 100 of FIG. 1 in connection with an exemplary embodiment of the master/slave management process 500 of FIG. 5. In the illustrated sequence 600, the master/slave management process 500 is initiated in response to receiving an input 602 from the user interface 114 that causes the browser application 120 to open, instantiate or otherwise generate a new presentation interface, such as a new browser tab 126. Upon instantiation, the new browser tab 126 having an embedded chat messaging interface accesses 604 the local storage 130 to identify whether there are any existing chat sessions corresponding to the same chat messaging service associated with chatbot system 104. For example, the new tab 126 may identify the presence of two existing active chat messaging sessions when the value of the ACTIVE_CHAT_SESSIONS local storage variable associated with an identifier for the chat messaging service associated with chatbot system 104 has a value equal to 2.

When the new browser tab 126 identifies existing chat messaging sessions, the new tab 126 broadcasts 606 a master/slave status request for the existing tabs 122, 124 associated with the same chat messaging service using a broadcast API. The existing tabs 122, 124 access their respective JSON object files to identify whether or not the respective tab 122, 124 is a master or slave based on the state of a private variable defined therein and then transmits or otherwise provides a response 610 back to the new tab 126 that indicates their respective status. In this regard, the master tab 122 may identify it is the master based on a value of a private variable in the JSON object file associated with the master tab 122 and provide a response indicating it is the master. Likewise, an existing slave tab 124 may identify it is a slave based on a value of a private variable (or the absence of such private variable) in the JSON object file associated with the tab 124 and provide a response indicating it is a slave. In exemplary embodiments, the new tab 126 waits until receiving indicia of an existing master or the number of received responses corresponds to the number of active chat messaging sessions (e.g., 2).

After the new tab 126 identifies the existing tab 122 as the master, the new tab 126 communicates 612 with the master tab 122 to retrieve or otherwise obtain 614 the chat messaging content from the session storage 132 associated with the master tab 122. After receiving the messaging content from the session storage 132 associated with the master tab 122 via the master tab 122, the new tab 126 may automatically populate the chat messaging interface within the new tab 126 with the up-to-date chat messaging content that reflects the state of the existing active chat. In exemplary embodiments, the new tab 126 instantiates 616 its session storage 132 with a copy of the chat messaging content received from the master tab 122 and configures its associated JSON object file to designate itself as a slave.

Thereafter, when a user manipulates the user interface 114 to input or otherwise provide 618 a new chat input via the chat messaging interface of the new tab 126, the new tab 126 provides 620 the new chat input to the master tab 122 using the broadcast API and updates its session storage 132 to include the newly-received chat messaging content. The master tab 122 similarly updates 622 its session storage 132 to include the newly-received chat messaging content and transmits or otherwise provides 624 the new chat input to the server system 106 via the existing communication session, for example, as a long-polling response to a previous long-polling request from the server system 106. Similarly, the server system 626 retransmits or otherwise provides the new chat input from the user to the chat messaging service at the chatbot system 104 via the existing communication session between the server system 106 and the chatbot system 104. The chat messaging service at the chatbot system 104 processes or otherwise analyzed the user input to generate corresponding chat response content and transmits or otherwise provides 628 the chat response to the server system 106, which, in turn provides 630 the chat response content back to the master tab 122 via the existing communication sessions. The master tab 122 updates its session storage 132 to include the chat response content and then generates a broadcast event that indicates new chat messaging content to the slave tabs 124, 126 via the broadcast API. In response to the broadcasted update, the new tab 126 automatically retrieves or otherwise obtains 632 the chat response content from the master tab 122, automatically updates 634 its session storage to include the chat response content, and automatically updates the chat messaging interface within the new tab 126 with the up-to-date chat messaging content that reflects the response from the chat messaging service.

By virtue of the master/slave management process 500, any number of new tabs can be opened without disrupting the existing communication session with the server. The existing communication session with the server can then be utilized by the new tabs to communicate information via the server via the master tab responsible for establishing and/or maintaining the existing communication session, thereby preserving server-side resources. It should be noted that because the private master/slave status variable is maintained in a file stored in memory independently or outside of browser storage, it may not persist across reloads. Thus, upon refresh or reload of what was previously the master tab, the master/slave management process 500 may be performed before re-designating the tab as master when the other existing tabs all respond indicating they are slaves.

It should be noted that the subject matter described herein may also be utilized to reassign the master when the master tab is closed. For example, when a slave tab attempts to pass a chat input to a no longer existing master tab (e.g., at 620 in the sequence 600), the slave tab may be configured to detect or otherwise identify the previous master tab no longer exists, and in response, initiate the master/slave management process 500 to verify whether any existing active chat sessions still exist (task 502). If not, the slave tab may automatically make itself the new master (e.g., tasks 504, 506, 508, 510). Otherwise, the slave tab may broadcast to see whether any of the other tabs are masters (e.g., tasks 512, 514, 516). If none of the existing tabs are masters, the slave tab may automatically make itself the new master (e.g., tasks 504, 506, 508, 510). Conversely, if another slave tab has elevated to master upon termination of the previous master, the slave tab may automatically update to account for the new master tab (e.g., tasks 516, 518).

Multi-Tenancy

Figure 7:
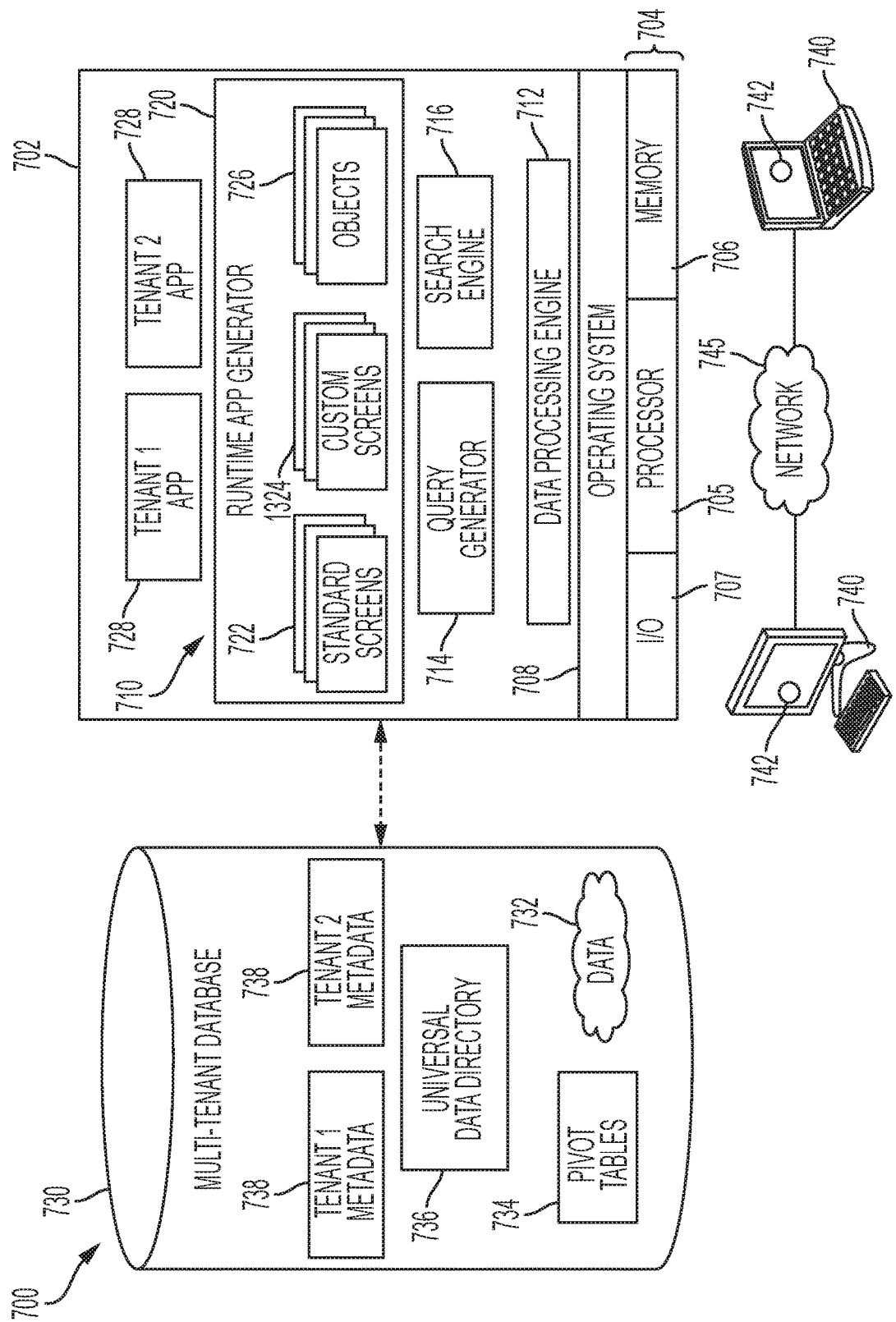
FIG. 7 is a block diagram of an exemplary multi-tenant database system suitable for use with the system of FIG. 1, in accordance with the disclosed embodiments.

FIG. 7 is a block diagram of an exemplary multi-tenant database system 700 suitable for use with the system 100 of FIG. 1, in accordance with the disclosed embodiments. The illustrated multi-tenant database system 700 of FIG. 7 includes a server 702 (e.g., server system 106) that dynamically creates and supports virtual applications 728 based upon data 732 from a common database 730 that is shared between multiple tenants, alternatively referred to herein as a multi-tenant database. Data and services generated by the virtual applications 728 are provided via a network 745 (e.g., data communication network 108) to any number of client devices 740 (e.g., client device 102, or the like), as desired. Each virtual application 728 is suitably generated at run-time (or on-demand) using a common application platform 710 that securely provides access to the data 732 in the database 730 for each of the various tenants subscribing to the multi-tenant system 700. In one or more embodiments, the subject matter described herein in connection with FIGS. 1-6 is implemented in the context of the multi-tenant database system 700, where the chat messaging widgets are integrated with or otherwise provided within instances of one or more virtual applications 728 generated by the server 702.

In accordance with one non-limiting example, the multi-tenant system 700 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 730. In this regard, each tenant includes one or more users associated with, assigned to, or otherwise belonging to that respective tenant. To put it another way, each respective user within the multi-tenant system 700 is associated with, assigned to, or otherwise belongs to a particular tenant of the plurality of tenants supported by the multi-tenant system 700. Tenants may represent customers, customer departments, business or legal organizations, and/or any other entities that maintain data for particular sets of users within the multi-tenant system 700 (i.e., in the multi-tenant database 730). For example, the application server 702 may be associated with one or more tenants supported by the multi-tenant system 700. Although multiple tenants may share access to the server 702 and the database 730, the particular data and services provided from the server 702 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 732 belonging to or otherwise associated with other tenants.

The multi-tenant database 730 is any sort of repository or other data storage system capable of storing and managing the data 732 associated with any number of tenants. The database 730 may be implemented using any type of conventional database server hardware. In various embodiments, the database 730 shares processing hardware 704 with the server 702. In other embodiments, the database 730 is implemented using separate physical and/or virtual database server hardware that communicates with the server 702 to perform the various functions described herein. In an exemplary embodiment, the database 730 includes a database management system or other equivalent software capable of determining an optimal query plan for retrieving and providing a particular subset of the data 732 to an instance of virtual application 728 in response to a query initiated or otherwise provided by a virtual application 728. The multi-tenant database 730 may alternatively be referred to herein as an on-demand database, in that the multi-tenant database 730 provides (or is available to provide) data at run-time to on-demand virtual applications 728 generated by the application platform 710.

In practice, the data 732 may be organized and formatted in any manner to support the application platform 710. In various embodiments, the data 732 is suitably organized into a relatively small number of large data tables to maintain a semi-amorphous "heap"-type format. The data 732 can then be organized as needed for a particular virtual application 728. In various embodiments, conventional data relationships are established using any number of pivot tables 734 that establish indexing, uniqueness, relationships between entities, and/or other aspects of conventional database organization as desired. Further data manipulation and report formatting is generally performed at run-time using a variety of metadata constructs. Metadata within a universal data directory (UDD) 736, for example, can be used to describe any number of forms, reports, workflows, user access privileges, business logic and other constructs that are common to multiple tenants. Tenant-specific formatting, functions and other constructs may be maintained as tenant-specific metadata 738 for each tenant, as desired. Rather than forcing the data 732 into an inflexible global structure that is common to all tenants and applications, the database 730 is organized to be relatively amorphous, with the pivot tables 734 and the metadata 738 providing additional structure on an as-needed basis. To that end, the application platform 710 suitably uses the pivot tables 734 and/or the metadata 738 to generate "virtual" components of the virtual applications 728 to logically obtain, process, and present the relatively amorphous data 732 from the database 730.

The server 702 is implemented using one or more actual and/or virtual computing systems that collectively provide the dynamic application platform 710 for generating the virtual applications 728. For example, the server 702 may be implemented using a cluster of actual and/or virtual servers operating in conjunction with each other, typically in association with conventional network communications, cluster management, load balancing and other features as appropriate. The server 702 operates with any sort of conventional processing hardware 704, such as a processor 705, memory 706, input/output features 707 and the like. The input/output features 707 generally represent the interface(s) to networks (e.g., to the network 745, or any other local area, wide area or other network), mass storage, display devices, data entry devices and/or the like. The processor 705 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 706 represents any non-transitory short or long term storage or other computer-readable media capable of storing programming instructions for execution on the processor 705, including any sort of random access memory (RAM), read only memory (ROM), flash memory, magnetic or optical mass storage, and/or the like. The computer-executable programming instructions, when read and executed by the server 702 and/or processor 705, cause the server 702 and/or processor 705 to create, generate, or otherwise facilitate the application platform 710 and/or virtual applications 728 and perform one or more additional tasks, operations, functions, and/or processes described herein. It should be noted that the memory 706 represents one suitable implementation of such computer-readable media, and alternatively or additionally, the server 702 could receive and cooperate with external computer-readable media that is realized as a portable or mobile component or application platform, e.g., a portable hard drive, a USB flash drive, an optical disc, or the like.

The application platform 710 is any sort of software application or other data processing engine that generates the virtual applications 728 that provide data and/or services to the client devices 740. In a typical embodiment, the application platform 710 gains access to processing resources, communications interfaces and other features of the processing hardware 704 using any sort of conventional or proprietary operating system 708. The virtual applications 728 are typically generated at run-time in response to input received from the client devices 740. For the illustrated embodiment, the application platform 710 includes a bulk data processing engine 712, a query generator 714, a search engine 716 that provides text indexing and other search functionality, and a runtime application generator 720. Each of these features may be implemented as a separate process or other module, and many equivalent embodiments could include different and/or additional features, components or other modules as desired.

The runtime application generator 720 dynamically builds and executes the virtual applications 728 in response to specific requests received from the client devices 740. The virtual applications 728 are typically constructed in accordance with the tenant-specific metadata 738, which describes the particular tables, reports, interfaces and/or other features of the particular application 728. In various embodiments, each virtual application 728 generates dynamic web content that can be served to a browser or other client program 742 associated with its client device 740, as appropriate.

The runtime application generator 720 suitably interacts with the query generator 714 to efficiently obtain multi-tenant data 732 from the database 730 as needed in response to input queries initiated or otherwise provided by users of the client devices 740. In a typical embodiment, the query generator 714 considers the identity of the user requesting a particular function (along with the user's associated tenant), and then builds and executes queries to the database 730 using system-wide metadata 736, tenant specific metadata 738, pivot tables 734, and/or any other available resources. The query generator 714 in this example therefore maintains security of the common database 730 by ensuring that queries are consistent with access privileges granted to the user and/or tenant that initiated the request. In this manner, the query generator 714 suitably obtains requested subsets of data 732 accessible to a user and/or tenant from the database 730 as needed to populate the tables, reports or other features of the particular virtual application 728 for that user and/or tenant.

Each database 730 can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems 700, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems 700, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system 700. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Still referring to FIG. 7, the data processing engine 712 performs bulk processing operations on the data 732 such as uploads or downloads, updates, online transaction processing, and/or the like. In many embodiments, less urgent bulk processing of the data 732 can be scheduled to occur as processing resources become available, thereby giving priority to more urgent data processing by the query generator 714, the search engine 716, the virtual applications 728, etc.

In exemplary embodiments, the application platform 710 is utilized to create and/or generate data-driven virtual applications 728 for the tenants that they support. Such virtual applications 728 may make use of interface features such as custom (or tenant-specific) screens 724, standard (or universal) screens 722 or the like. Any number of custom and/or standard objects 726 may also be available for integration into tenant-developed virtual applications 728. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 726 such as "account" objects, "opportunity" objects, "contact" objects, or the like. The data 732 associated with each virtual application 728 is provided to the database 730, as appropriate, and stored until it is requested or is otherwise needed, along with the metadata 738 that describes the particular features (e.g., reports, tables, functions, objects, fields, formulas, code, etc.) of that particular virtual application 728. For example, a virtual application 728 may include a number of objects 726 accessible to a tenant, wherein for each object 726 accessible to the tenant, information pertaining to its object type along with values for various fields associated with that respective object type are maintained as metadata 738 in the database 730. In this regard, the object type defines the structure (e.g., the formatting, functions and other constructs) of each respective object 726 and the various fields associated therewith.

Still referring to FIG. 7, the data and services provided by the server 702 can be retrieved using any sort of personal computer, mobile telephone, tablet or other network-enabled client device 740 on the network 745. In an exemplary embodiment, the client device 740 includes a display device, such as a monitor, screen, or another conventional electronic display capable of graphically presenting data and/or information retrieved from the multi-tenant database 730. Typically, the user operates a conventional browser application or other client program 742 executed by the client device 740 to contact the server 702 via the network 745 using a networking protocol, such as the hypertext transport protocol (HTTP) or the like. The user typically authenticates his or her identity to the server 702 to obtain a session identifier ("SessionID") that identifies the user in subsequent communications with the server 702. When the identified user requests access to a virtual application 728, the runtime application generator 720 suitably creates the application at run time based upon the metadata 738, as appropriate. As noted above, the virtual application 728 may contain Java, ActiveX, or other content that can be presented using conventional client software running on the client device 740; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The preceding description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although a schematic shown in a drawing figure may depict one exemplary arrangement of elements, additional intervening elements, devices, features, or components may be present in a practical embodiment of the depicted subject matter.

For the sake of brevity, conventional techniques related to chatbots, artificial intelligence, database systems, multi-tenancy, on-demand database systems, signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of supporting a communication session with a remote device across a plurality of graphical user interfaces presented at a client device coupled to a network, the method comprising:
    broadcasting, by a first graphical user interface of the plurality of graphical user interfaces, a master/slave status request to one or more of the plurality of graphical user interfaces presented at the client device using an application program interface (API);
    receiving, by the first graphical user interface, one or more responses from the one or more of the plurality of graphical user interfaces;
    configuring, by the first graphical user interface, a file associated with the first graphical user interface maintained at the client device as a slave based at least in part on a response from a master graphical user interface of the plurality of graphical user interfaces; and
    thereafter communicating, by the first graphical user interface, with the remote device over the network via the master graphical user interface of the plurality of graphical user interfaces.

2. The method of claim 1, further comprising identifying, by the first graphical user interface, one or more existing active chat sessions with a chat messaging service associated with a chat messaging interface of the first graphical user interface prior to broadcasting the master/slave status request.

3. The method of claim 2, wherein identifying the one or more existing active chat sessions comprises determining a number of existing active chat sessions based on a value of a local storage variable in local storage associated with a browser application.

4. The method of claim 1, wherein configuring the file comprises copying chat messaging content from session storage associated with the master graphical user interface to session storage associated with the first graphical user interface.

5. The method of claim 1, wherein configuring the file comprises creating a JavaScript Object Notation (JSON) object that does not include a private variable identifying the first graphical user interface as a master.

6. The method of claim 5, wherein a second JSON object associated with the master graphical user interface includes the private variable identifying the master graphical user interface as the master.

7. The method of claim 1, wherein configuring the file comprises creating a JavaScript Object Notation (JSON) object with a private variable having a value identifying the first graphical user interface as a slave.

8. The method of claim 7, wherein a second JSON object associated with the master graphical user interface includes the private variable having a second value identifying the master graphical user interface as a master.

9. A method for communicating during a chat messaging session, by a client device comprising a computer system configured to store, maintain, execute, and support a browser application that includes chat messaging functionality, the method comprising:
    presenting a plurality of browser-based presentation interfaces comprising at least one of browser-based tabs and browser-based windows, by the client device, wherein the plurality of browser-based presentation interfaces are associated with the browser application, and wherein the plurality of browser-based presentation interfaces include a master presentation interface and at least one slave presentation interface;
    presenting a chat messaging interface for the chat messaging session, by the client device via the master presentation interface, wherein the chat messaging interface is configured to display the chat messaging session including chat messaging data;
    establishing a single communication session with a server system providing the chat messaging session to the browser application, by the client device via the master presentation interface;
    broadcasting, by a new presentation interface of the plurality of browser-based presentation interfaces including a second chat messaging interface to be associated with the chat messaging session, a master/slave status request to other ones of the plurality of browser-based presentation interfaces;
    receiving, by the new presentation interface, a response from the master presentation interface indicating the master presentation interface is a master;
    configuring, by the new presentation interface, a file associated with the new presentation interface as a slave based at least in part on the response from the master presentation interface; and
    receiving, by the new presentation interface, a new chat input from a user of the client device via the second chat messaging interface; and
    providing, by the new presentation interface, the new chat input to the master presentation interface, wherein the master presentation interface provides the new chat input to the server system via the single communication session.

10. The method of claim 9, further comprising:
    receiving a new chat response to the new chat input, by the chat messaging interface of the master presentation interface via the single communication session;
    storing the new chat response in session storage associated with the master presentation interface;
    providing the new chat response to the new presentation interface; and
    rendering, by the new presentation interface, the new chat response in the second chat messaging interface.

11. The method of claim 10, wherein providing the new chat response comprises the master presentation interface providing the new chat response via a broadcast pipeline for the browser application.

12. The method of claim 9, wherein configuring the file comprises:
    providing, by the new presentation interface, a request for session storage of the master presentation interface, wherein the master presentation interface transmits the session storage comprising the chat messaging data to the new presentation interface; and copying the chat messaging data to the session storage associated with the new presentation interface.

13. The method of claim 9, further comprising, prior to broadcasting the master/slave status request, identifying, by the new presentation interface, existence of the other ones of the plurality of browser-based presentation interfaces associated with the chat messaging session based on a variable in local storage for the browser application.

14. The method of claim 9, the master presentation interface including a JavaScript Object Notation (JSON) object associated with the master presentation interface having a private variable identifying the master presentation interface as a master, wherein configuring the file comprises the new presentation interface creating a second JSON object that is associated with the new presentation interface and has a different value for the private variable identifying the new presentation interface as a slave.

15. The method of claim 14, wherein:
the JSON object includes the chat messaging data; and
configuring the file further comprises:
providing, by the new presentation interface, a request for the session storage of the master presentation interface, wherein the master presentation interface transmits the chat messaging data to the new presentation interface; and
copying the chat messaging data to the session storage associated with the new presentation interface.

16. The method of claim 9, the master presentation interface including a JavaScript Object Notation (JSON) object associated with the master presentation interface having a master status variable identifying the master presentation interface as a master, wherein configuring the file comprises the new presentation interface creating a second JSON object associated with the new presentation interface without the master status variable.

17. The method of claim 16, wherein:
the JSON object includes the chat messaging data; and
configuring the file further comprises:
providing, by the new presentation interface, a request for session storage of the master presentation interface, wherein the master presentation interface transmits the chat messaging data from the JSON object to the new presentation interface; and
copying the chat messaging data to the session storage associated with the new presentation interface.

18. The method of claim 9, wherein broadcasting the master/slave status request comprises the new presentation interface generating a broadcast event using a broadcast application program interface (API).

19. A non-transitory, computer-readable medium containing instructions thereon, which, when executed by a processor of the client device, cause the processor to perform the method of claim 9.

20. A client device comprising:
a data storage element to maintain local storage associated with a browser application and session storage associated with respective ones of a plurality of presentation interfaces associated with the browser application, wherein the local storage includes indication of a number of the plurality of presentation interfaces associated with an active chat messaging session;
a display to present the plurality of presentation interfaces associated with the browser application; and
a processor communicatively coupled to the data storage element and the display and configurable to:
establish a single communication session with a server system providing the active chat messaging session via a master presentation interface of the plurality of presentation interfaces;
broadcast, on behalf of a new presentation interface of the plurality of presentation interfaces including a chat messaging interface to be associated with the active chat messaging session, a master/slave status request to other ones of the plurality of presentation interfaces based on the number in the local storage;
configuring a file associated with the new presentation interface as a slave based at least in part on a response to the master/slave status request from the master presentation interface; and
thereafter communicate, on behalf of the new presentation interface, with the server system via the single communication session associated with the master presentation interface.

* * * * *